United States Patent [19]

Suzuki

[11] Patent Number: 5,410,912
[45] Date of Patent: May 2, 1995

[54] MASS FLOW SENSOR

[75] Inventor: Isao Suzuki, Tokyo, Japan

[73] Assignee: MKS Japan, Inc., Tokyo, Japan

[21] Appl. No.: 227,983

[22] Filed: Apr. 15, 1994

Related U.S. Application Data

[63] Continuation of Ser. No. 897,798, Jun. 12, 1992, abandoned.

[30] Foreign Application Priority Data

Jun. 13, 1991 [JP] Japan ................. 3-057048 U
Jun. 13, 1991 [JP] Japan ................. 3-181514
Jun. 13, 1991 [JP] Japan ................. 3-181515

[51] Int. Cl.⁶ .................................................. G01F 1/68
[52] U.S. Cl. ................................ 73/204.15; 73/204.22
[58] Field of Search ............. 73/204.15, 204.16, 204.18, 73/204.19, 204.22

[56] References Cited

U.S. PATENT DOCUMENTS

| | | | |
|---|---|---|---|
| 2,726,546 | 12/1955 | King | 73/204.15 |
| 2,859,617 | 11/1958 | Adams | 73/204.22 |
| 2,953,022 | 9/1960 | Laub | 73/204.22 |
| 3,938,384 | 2/1976 | Blair . | |
| 4,283,944 | 8/1981 | Gruner et al. . | |
| 4,464,932 | 8/1984 | Ewing et al. . | |
| 4,480,467 | 11/1984 | Harter et al. | 73/204.21 |
| 4,522,058 | 6/1985 | Ewing . | |
| 4,548,077 | 10/1985 | van Putten | 73/204.19 |
| 4,571,801 | 2/1986 | Ewing . | |
| 4,587,842 | 5/1986 | Handtmann | 73/204 |
| 4,616,505 | 10/1986 | Jouwsma | 73/204.22 |
| 4,627,279 | 12/1986 | Ohta et al. | 73/204.15 |
| 4,679,585 | 7/1987 | Ewing . | |
| 4,793,176 | 12/1988 | Sato et al. | 73/204.19 |
| 4,815,280 | 3/1989 | Tujimura et al. . | |
| 4,829,818 | 5/1989 | Bohrer | 73/204.22 |
| 4,877,051 | 10/1989 | Day . | |
| 4,936,144 | 6/1990 | Djorup | 73/204.21 |
| 4,984,460 | 1/1991 | Isoda . | |
| 5,094,105 | 3/1992 | Emmert et al. | 73/204.25 |

FOREIGN PATENT DOCUMENTS

| | | |
|---|---|---|
| 854105 | 10/1952 | Germany . |
| 58-16128 | 3/1983 | Japan . |
| 48606 | 1/1986 | Japan ................. 73/204.15 |
| 2019578A | 10/1979 | United Kingdom . |

Primary Examiner—Herbert Goldstein
Assistant Examiner—Harshad Patel
Attorney, Agent, or Firm—Wenderoth, Lind & Ponack

[57] ABSTRACT

A mass flow sensor is capable of accurately measuring a mass flow irrespective of changes in the ambient temperature. The mass flow sensor includes at least one heating resistor disposed on a portion of a sensor pipe through which a fluid to be measured flows and a housing for the sensor pipe. The heating resistor and a temperature sensitive resistance constitute a bridge circuit. The temperature sensitive resistance is disposed in the housing. The resistance of the sensor changes in accordance with the change in the temperature of the housing to thereby adjust the change in the resistance of the heating resistor. Further, an improved temperature sensitive matching resistor is suitably used in the mass flow sensor, in which a plurality of temperature sensitive resistances having equal characteristics are integrated.

8 Claims, 13 Drawing Sheets

MASS FLOW SENSOR

This application is a Continuation of now abandoned application Ser. No. 07/897,798, filed Jun. 12, 1992, abandoned.

BACKGROUND OF THE INVENTION

This invention relates to a mass flow sensor utilized for measurement of mass flow of a gas or other fluid used in semiconductor producing processes.

Two types of mass flow meters have been heretofore known, one of which is a constant current type sensor represented typically by, for example, U.S. Pat. No. 3,938,384 and the other is a constant temperature type sensor disclosed by U.S. Pat. No. 4,464,932, Japanese Patent Publication No. 16128/83 and U.S. Pat. No. 4,815,280.

An example of the known constant current type sensor is shown in FIG. 1, in which a fluid flows in a pipe in the direction of arrow X. Heating resistors $R_1$ and $R_2$ are disposed about the pipe on the downstream and upstream sides, respectively, and are provided with a constant current I by a constant current source 901. Here, since voltages $V_1$ and $V_2$ are generated at the heating resistors $R_1$ and $R_2$, respectively, the difference thereof ($V_1$-$V_2$) is taken out from a differential amplifier 902 through a bridge circuit shown in FIG. 1 for detection of the mass flow. Since the mass flow Q corresponds to an electric displacement generated in the heating resistors $R_1$ and $R_2$ when a fluid flows therethrough, the mass flow Q can be directly detected by the following formula:

$$Q \propto \Delta V \cdot I \propto \Delta V$$

In contrast to this, in the constant temperature type sensor, an example of which is shown in FIG. 2, a pipe through which a fluid flows in the direction of arrow X is provided thereabout with heating resistors $R_{1a}$ and $R_{1b}$ on the downstream and upstream sides, respectively, to which an electric current is supplied through transistors $T_1$ and $T_2$, respectively. The heating resistors $R_{1a}$ and $R_{1b}$ in combination with resistances $R_{2a}$, $R_{3a}$, $R_{4a}$ and $R_{2b}$, $R_{3b}$, $R_{4b}$, respectively, form bridge circuits, respectively. In each of these bridge circuits, a difference between voltages taken out at two points thereof is obtained by a comparator 911 or 912 and used to control the base currents of the transistors $T_1$ and $T_2$ so as to balance the bridge circuits. In other words, the control is performed to make the resistance values of the heating resistors $R_{1a}$ and $R_{1b}$ constant. As a result, the temperature of the heating resistors $R_{1a}$ and $R_{1b}$ is maintained at a predetermined value irrespective of the flow of the fluid. Here, the mass flow Q corresponds to an electric displacement generated in the heating resistors $R_{1a}$ and $R_{1b}$ when the fluid flows therethrough and is represented by the following formula:

$$Q \propto (V_1^2/R_{1a} - V_2^2/R_{1b}) \quad (1)$$
If $R = R_{1a} = R_{1b}$
then $Q \propto (V_1 + V_2)(V_1 - V_2)/R$
If $\Delta V = V_1 - V_2$
then $Q \propto (V_1 + V_2) \cdot \Delta V/R$
If $(V_1 + V_2)/R$ is constant
then $Q \propto \Delta V$ In the two types of known mass flow sensor described above, the constant current type sensor has two characteristic features. Firstly, since the current flowing through the heating resistors $R_1$ and $R_2$ is constant, the temperature of the heat generated by the resistors $R_1$ and $R_2$ changes automatically in response to the change in the ambient temperature. Accordingly, it can operate in stable condition over a wide temperature range without the necessity of using a special temperature correction circuit. Secondly, the circuit construction of this sensor is very simple. On the other hand, however, the constant current type sensor has a disadvantage in that a relatively long time is required until the temperature of the heating resistors $R_1$ and $R_2$ changes in response to the flowing fluid and accordingly the response is slow.

In contrast to this, the constant temperature type sensor, in which the heating resistors $R_{1a}$ and $R_{1b}$ are always maintained at a constant temperature, has a characteristic feature that its response is very quick. In fact, its response is generally ten times or more quicker than that of the constant current type sensor. On the other hand, however, the constant temperature type sensor presents a problem in that, when the ambient temperature approaches the predetermined heating temperature of the heating resistors $R_{1a}$ and $R_{1b}$, the voltages $V_1$ and $V_2$ applied to the heating resistors $R_{1a}$ and $R_{1b}$ drop to make measurement difficult and when the ambient temperature exceeds the predetermined heating temperature the sensor becomes inoperable. Accordingly, it is essential that this sensor is provided with some type of a correction circuit.

Therefore, Formula (1) above can apply only when the ambient temperature and gas temperature Ta are constant. For this reason, in U.S. Pat. No. 4,815,280, it is assumed that the gas temperature Ta is proportional to $(1/(V_1+V_2))$ and that the sensitivity decreases as the gas temperature Ta rises or the value of $(1/(V_1+V_2))$ increases and the flow Q is obtained by the following formula:

$$Q = \Delta V/(V_1+V_2) \quad (2)$$

Even if the decrease in sensitivity is compensated for by this method, however, the range in which formula (2) above applies is narrower than that of the constant current type sensor.

Therefore, U.S. Pat. No. 4,984,460 discloses a technical art of preventing the decrease in sensitivity by means of a circuit, the principle of which is shown in FIG. 3, in which the ambient temperature detecting resistance $R_{3b}$ is connected in series to a heating resistor $R_{1b}$ of a bridge circuit comprising resistances $R_{5b}$, $R_{7b}$ and $R_{9b}$ besides the heating resistor $R_{1b}$ and further the ambient temperature detecting resistance $R_{4b}$ is connected in series to a heating resistor $R_{2b}$ of a bridge circuit comprising resistances $R_{6b}$, $R_{8b}$ and $R_{10b}$ besides the heating resistor $R_{2b}$. When the ambient temperature rises, since the resistance values of the ambient temperature detecting resistances $R_{3b}$ and $R_{4b}$ are increased by means of the circuit shown in FIG. 3, control is performed so as to increase the temperature of the heating resistors $R_{1b}$ and $R_{2b}$ in response to the amount of increase of the resistance values, to thereby prevent a decrease in sensitivity of the sensor. Here, the temperature of the heating resistance $R_{1b}$ is predetermined to be higher than that of the ambient temperature detecting resistance $R_{3b}$ by the proportion of the resistance $R_{5b}$.

On the other hand, however, the proportion in resistance value of the resistance $R_{5b}$ to the ambient temperature detecting resistance $R_{3b}$ gradually decreases as the ambient temperature increases, whereby the difference between the temperature of the heating resistors $R_{1b}$, $R_{2b}$ and the ambient temperature gradually decreases. In other words, the technical merit provided by this known technical art is such that the degree of the decrease in sensitivity caused as the temperature increases is suppressed such that the temperature is fully compensated for or the practical temperature range is substantially improved. Further, even if resistances having the same temperature coefficient and resistance value as those of the heating resistors $R_{1b}$ and $R_{2b}$ are used as the ambient temperature detecting resistances $R_{3b}$ and $R_{4b}$, these ambient temperature detecting resistances $R_{3b}$ and $R_{4b}$ are also heated because a current having the same value as the current flowing in each of the heating resistors $R_{1b}$ and $R_{2b}$ flows in each of the ambient temperature detecting resistances $R_{3b}$ and $R_{4b}$. This presents a problem in that the zero point of the bridge circuit becomes unstable because the resistance values of the ambient temperature detecting resistances $R_{3b}$ and $R_{4b}$ finally vary in accordance with the surrounding radiation balance.

Further, in a prior art electronic circuit, an integral matching resistance used in a plurality of independent circuits was subject to the condition that the temperature coefficient of it was very small. On the other hand, it was very difficult to bring the resistance temperature sensors into matching. Therefore, when the same temperature correction required use of a resistance temperature sensor, it had to select a plurality of resistance temperature sensor elements having the same characteristics. In an example of a prior art temperature sensing resistor shown in FIG. 4, when signals $S_A$ and $S_B$ are amplified by inversion amplifiers 71 and 72, respectively, and outputted, resistances having the same characteristics are selected as feedback resistances 83 and 84 connected to input resistances 73 and 74, respectively. The feedback resistances 83 and 84 are disposed on a base 81 provided with radiation fins 82 so that temperature correction is performed in the same environment.

In the prior art sensor shown in FIG. 4, however, it was troublesome to select resistances having the same characteristics from among a large number of resistances and, when the temperature sensing resistances were used at the same position, it was necessary to put the resistances together. Accordingly, a preintegrated temperature sensitive matching resistor has long been sought.

SUMMARY OF THE INVENTION

An object of the present invention is to provide a mass flow sensor which is capable of performing accurate measurement irrespective of a surrounding radiation balance.

Another object of the present invention is to provide a mass flow sensor which responds quickly and is capable of performing accurate measurement irrespective of ambient temperature.

A further object of the present invention is to provide a temperature sensitive matching resistor in which a plurality of temperature resistances having the same characteristics are integrated.

In the mass flow sensor according to the present invention, at least one heating resistor is disposed in a portion of a sensor pipe through which a fluid flows, to detect the mass flow. This mass flow sensor comprises a bridge circuit including the heating resistor and a temperature sensitive resistance for detecting temperature, and a housing for the sensor pipe. Further, since the housing is provided with a temperature sensitive resistance, the characteristics of the temperature sensitive resistance change corresponding to the change in temperature of the housing to make accurate measurement possible corresponding to the change in characteristics of the heating resistor.

According to an embodiment of the present invention, the housing is provided with a chamber for receiving the sensor pipe and a chamber for receiving the temperature sensor resistance. The heating resistor comprises a first heating resistor disposed upstream of the sensor pipe and a second heating resistor disposed downstream of the sensor pipe. The bridge circuit comprises a first bridge circuit including the first heating resistor and a second bridge circuit including the second heating resistor. Each of the first and second bridge circuits is provided on one side thereof with a temperature sensitive matching resistance as a temperature sensitive resistance formed on the same substrate and having the same temperature coefficient. Since the temperature sensitive resistances of the bridge circuits are the temperature sensitive matching resistances which are received in the chambers of the housing, it is possible to accurately detect the temperature changes and to perform accurate measurement.

According to another embodiment of the present invention, since both ends of the sensor pipe are thermally connected to each other by means of a thermal conductor and since the heat of the sensor pipe is radiated to the housing at one point thereof, it is possible to obviate errors in measurement due to uneven distribution of the ambient temperature. The sensor pipe is connected to cylindrical connecting members and can be easily and accurately positioned in the housing by means of an upper casing and a lower casing.

The mass flow sensor according to the present invention is a mass flow sensor having a first heating resistor and a second heating resistor disposed upstream and downstream with respect to a flowing fluid, respectively, to detect its mass flow and comprising a first bridge circuit including said first heating resistor, a second bridge circuit including said second heating resistor, and a control circuit for supplying an electric current to said first and second bridge circuits to bring them into a balanced state, in which said first and second bridge circuits are provided with temperature sensitive matching resistances, respectively, having the same temperature coefficient in the other bridge routes which are different from bridge routes through which the electric current flows to each of the heating resistors. Thus, since the temperature sensitive matching resistances provided in the first and second bridge circuits are adapted, even when they once lose their balance in response to changes in the ambient temperature or the temperature of the gas to be measured in the respective bridge circuits, to restore the balance, they can follow the changes in the ambient temperature. Further, since the temperature sensitive matching resistances are disposed on the side on which the electric current identical to that flowing in the heating resistor side does not flow, they can have a large resistance value to thereby suppress the temperature rise due to the current and to accurately measure the temperature. Furthermore, the temperature sensitive matching resistances can be resistances forming one side of each of the bridge circuits and are operable, even when the balance in each of the bridge circuits is lost by the change in the resistance value due to tile change in the temperature, to bring the bridge circuits into a balanced state, the difference between the temperature of the heating resistors and the ambient temperature is not reduced by the temperature change and an accurate detection of the mass flow is possible over a wide range of temperatures.

In the mass flow sensor according to an embodiment of the present invention in which the temperature sensitive matching resistances are formed on the same substrate, the values of the resistances are changed by the temperature change at the same position and, therefore, it is possible to perform an accurate measurement without fluctuation of the zero point in each of the bridge circuits.

In the mass flow sensor according to another embodiment of the present invention in which the temperature sensitive matching resistances are formed on a tubular substrate, it is possible to easily provide the temperature sensitive matching resistances at the suitable positions and to adequately correct the output thereof in response to the gas temperature.

In the mass flow sensor according to a further embodiment of the present invention in which the sensor pipe has bifurcations one of which is provided with the temperature sensitive matching resistance, it is possible to secure operation based on detection of accurate gas temperature.

In the mass flow sensor according to a still further embodiment of the present invention in which the temperature sensitive matching resistances are formed of platinum patterns, it is possible to reliably detect high temperatures (with high stability).

In the mass flow sensor according to a still further embodiment of the present invention of a constant temperature type, response of the sensor to changes in the flow of the fluid is very quick. Further, since the heating resistances and the temperature sensitive matching resistances are formed to have the same temperature coefficient, the temperature changes in the heating resistors can be accurately detected by the temperature sensitive matching resistances to thereby secure the balance of the bridge circuits.

According to a still further embodiment of the present invention, a temperature sensitive matching resistor comprises a plurality of temperature sensitive resistances symmetrically formed on a nonconductive substrate so as to be of the same resistance value even when a temperature distribution is generated on the nonconductive substrate. Accordingly, the resistances each comprising said patterns have the same resistance value without being effected by the temperature distribution on the substrate. A plurality of patterns formed on the same substrate symmetrically with respect to a line or a point constitute temperature sensitive resistances having the same characteristics.

DETAILED DESCRIPTION OF THE PREFERRED EMBODIMENTS

Figure 1:
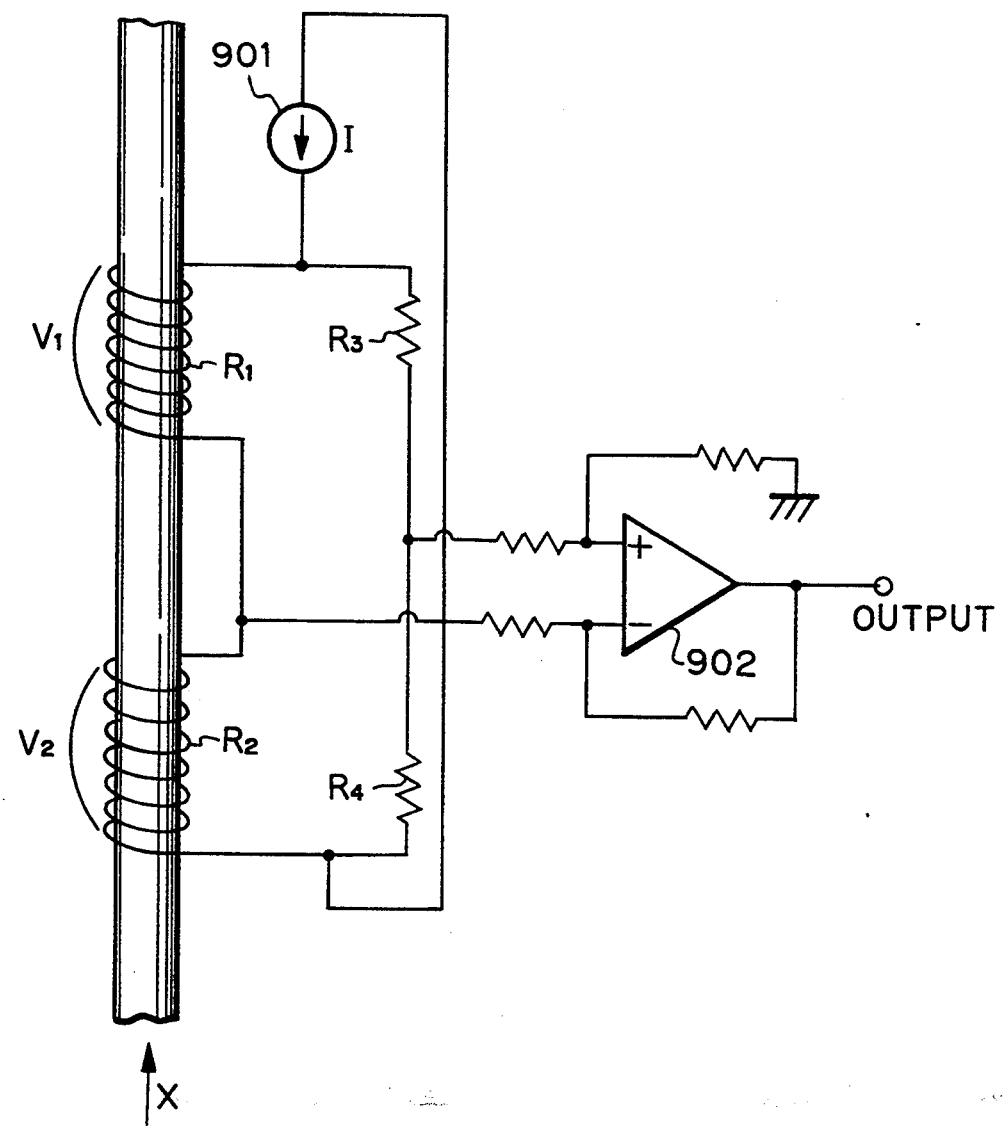
FIG. 1 is a circuit diagram of an example of a prior art mass flow sensor.
Figure 2:
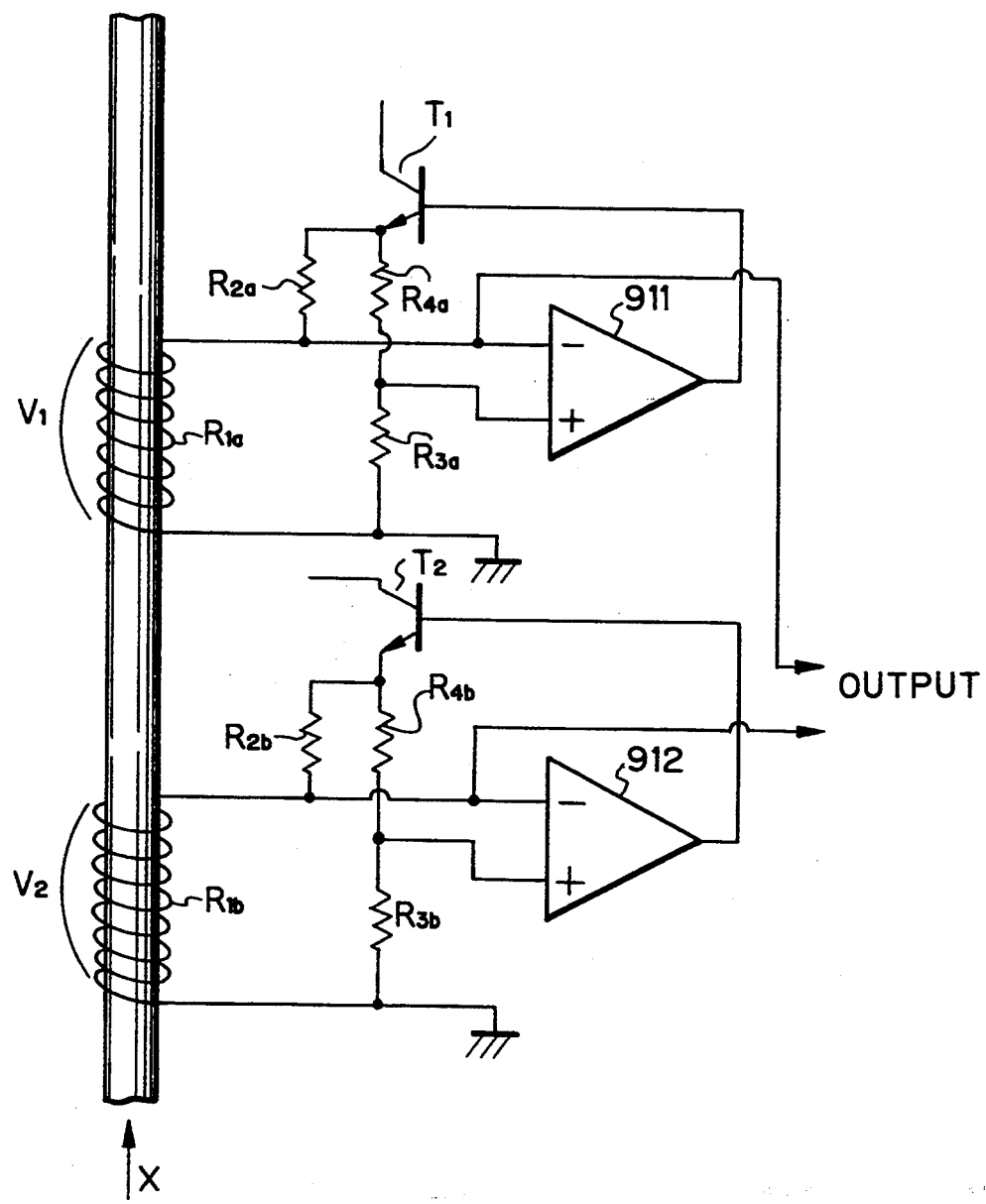
FIG. 2 is a circuit diagram of another example of a prior art mass flow sensor.
Figure 3:
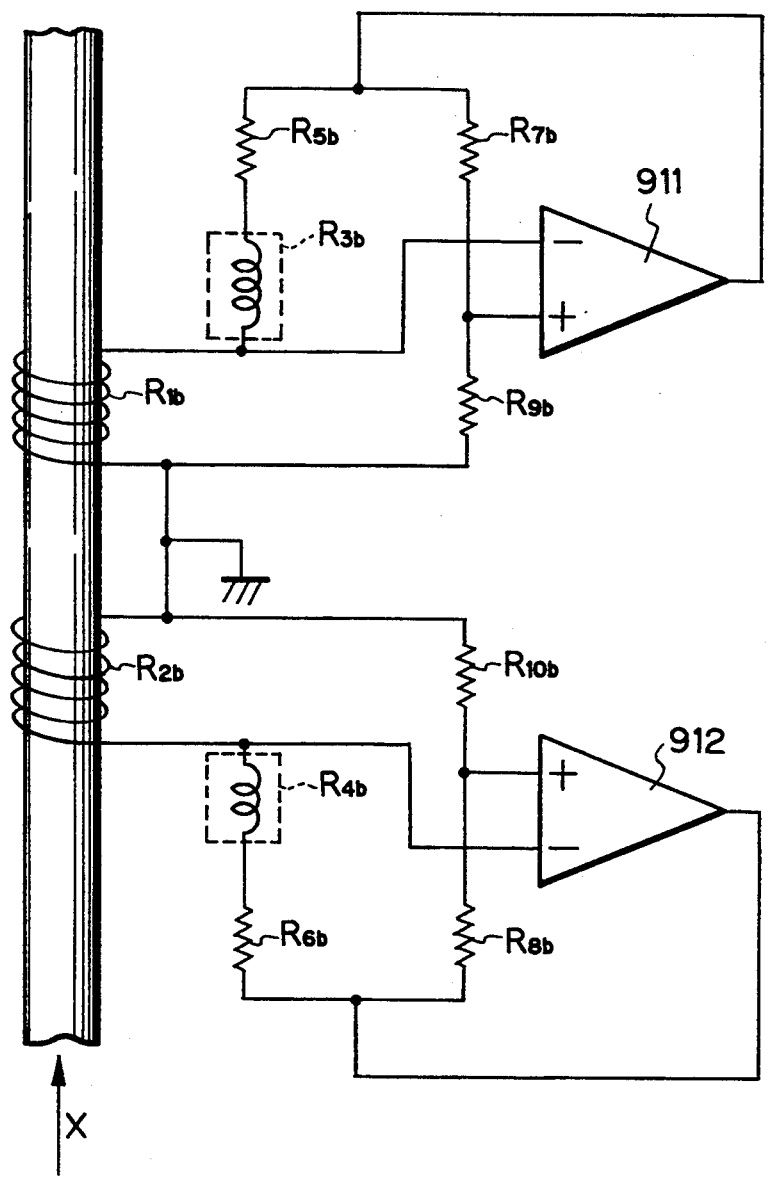
FIG. 3 is a circuit diagram of a further example of a prior art mass flow sensor.
Figure 4:
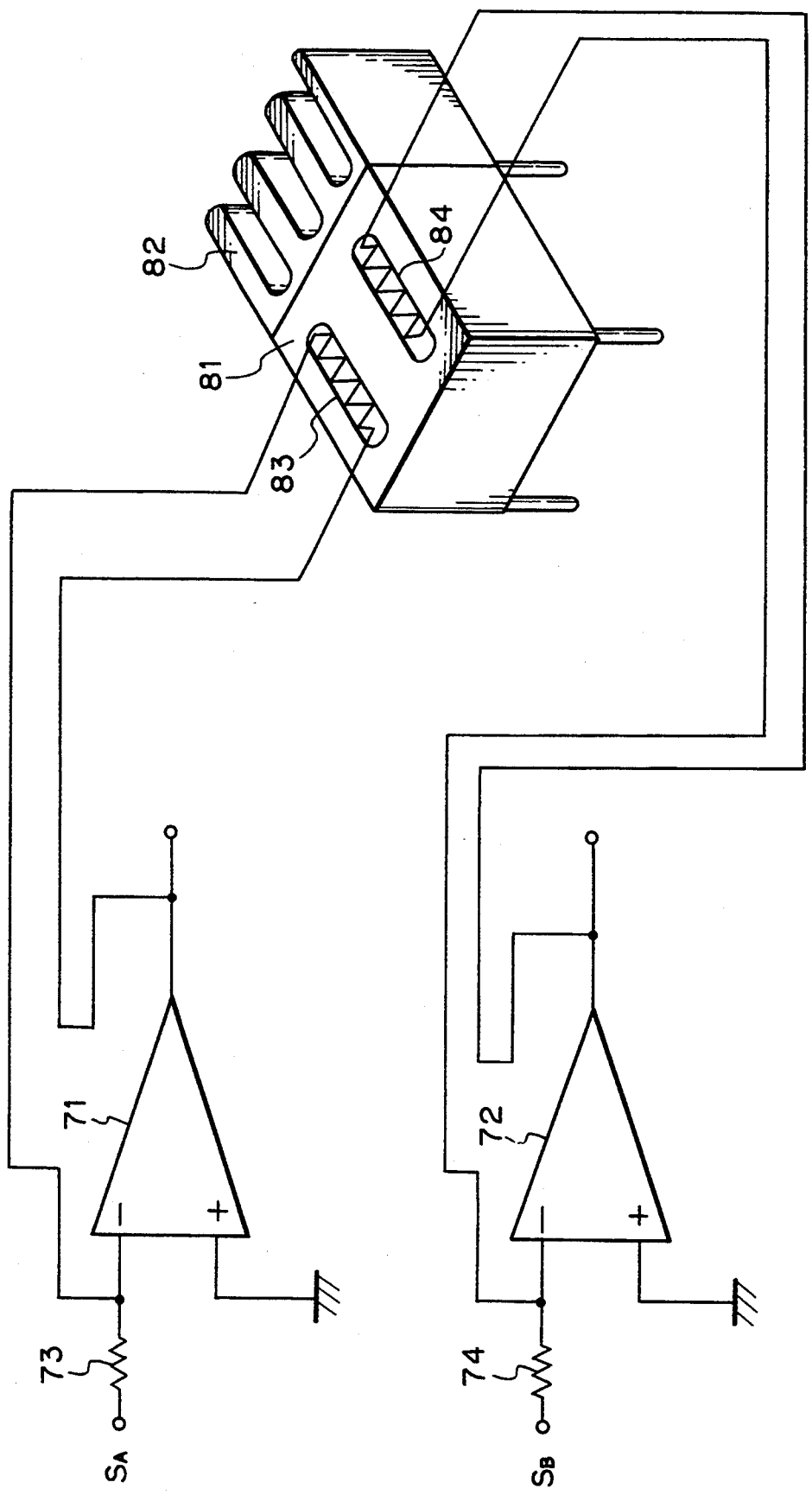
FIG. 4 shows a prior art temperature sensitive resistor in actual use.
Figure 5:
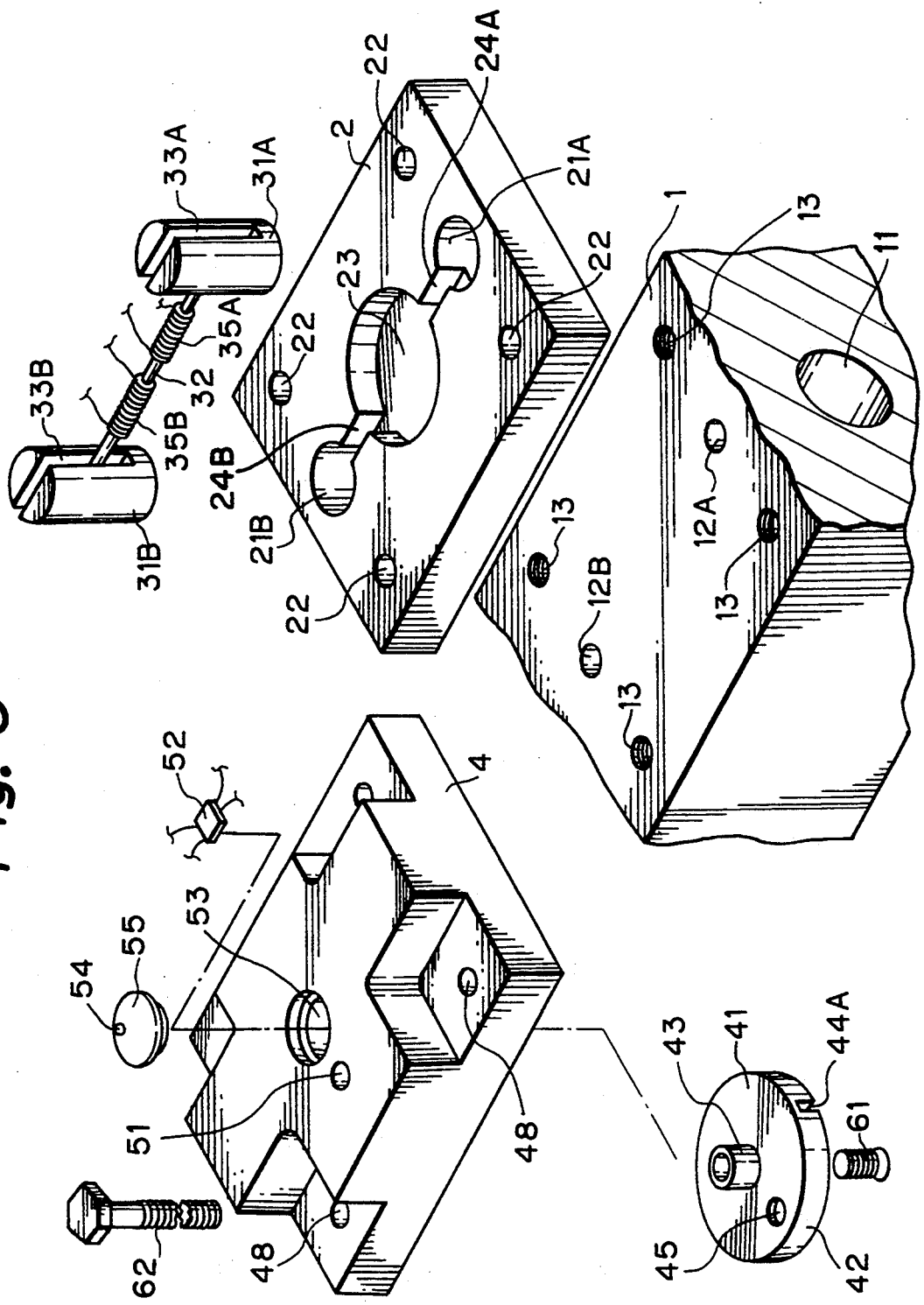
FIG. 5 is an exploded perspective view of an embodiment of the mass flow sensor according to the present invention.
Figure 6:
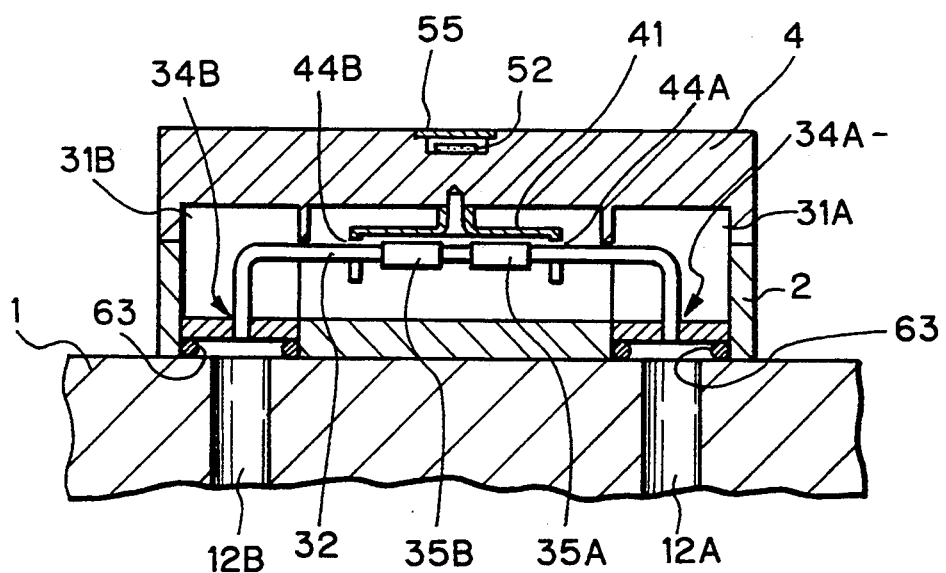
FIG. 6 is a sectional view of essential portions of the mass flow sensor of FIG. 5.

The preferred embodiments of the mass flow sensor and the temperature sensitive matching resistor according to the present invention will now be described in detail with reference to the drawings. Firstly, the construction of an embodiment of the mass flow sensor according to the present invention will be described with reference to FIGS. 5 to 8. As shown in FIGS. 5 and 6, a base 1 having a passage 11 formed therethrough for passing a fluid from a source thereof is provided on the bottom of a housing. A lower casing 2 having two through-holes 21A and 21B is disposed on the base 1. Cylindrical connecting members 31A and 31B having a sensor pipe 32 connected therebetween are fitted into the through-holes 21A and 21B of the lower casing 2, respectively. An upper casing 4 having an umbrella-shaped heat conducting member 41 connected thereto is placed to cover the lower casing 2. The base 1 is provided with holes 12A and 12B formed vertically to communicate with the passage 11 and further provided with four threaded holes 13 as shown in FIG. 5. The lower casing 2 is provided with four throughholes 22 formed at positions corresponding to the threaded holes 13 of the base 1 and with a cylindrical blind hole 23 formed at the central portion of the upper surface thereof for receiving the sensor pipe 32. The cylindrical blind hole 23 is communicated with the through-holes 21A and 21B through grooves 24A and 24B, respectively.

The cylindrical connecting members 31A and 31B are provided with slots 33A and 33B, respectively, each extending from the top surface to the proximity of the bottom and with holes 34A and 34B, respectively, each extending from the bottom of the slot to the central portion of the bottom of the cylindrical connecting member. The sensor pipe 32 is fitted at the opposite ends thereof into the holes 34A and 34B, respectively, in such a depth that the lower surfaces of the ends of the sensor pipe 32 are flush with the bottom surfaces of the cylindrical connecting members 31A and 31B, respectively. The sensor pipe 32 is connected to the cylindrical connecting members 31A and 31B by welding it on the peripheral surfaces at the opposite ends thereof. The sensor pipe 32 is provided with heating resistors 35A and 35B disposed toward the right and left from the central portion thereof, respectively.

Figure 7:
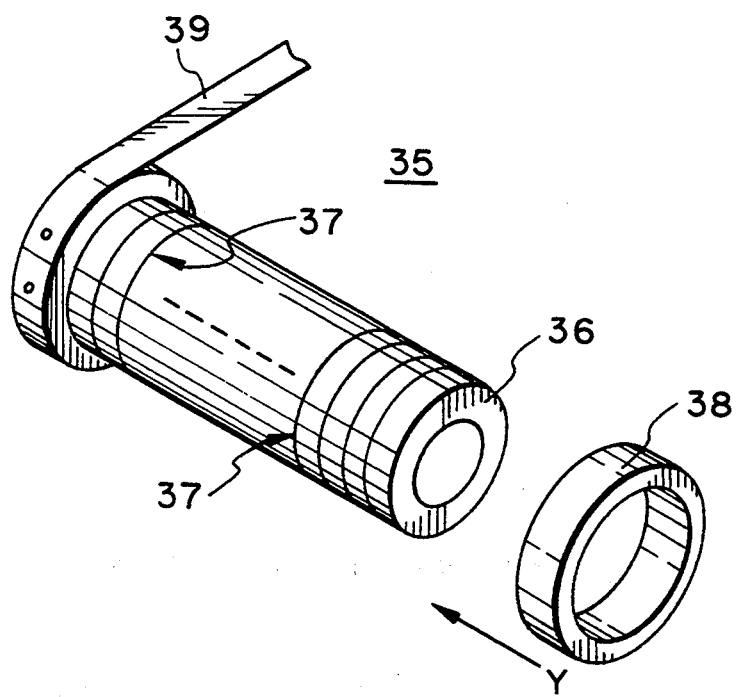
FIG. 7 is an exploded perspective view of a heating resistor shown in FIG. 6.

The heating resistors 35A and 35B are obtained through the process shown in FIG. 7. That is, platinum (Pt) is evaporated onto the peripheral surface of a ceramic pipe 36 having an inside diameter substantially equal to the outside diameter of the sensor pipe 32. Then a portion of the platinum layer is helically removed by laser working and trimming to expose ceramic ground 37 in a helical line, to thereby obtain one of the heating resistors 35A or 35B having the desired resistance value. A metal ring 38 is fitted to both ends of the heating resistor as shown by arrow Y, and platinum foil 39 having a width of about 0.5 mm is wound about the peripheral surface of each of the metal rings 38 and secured thereto by resistance welding to be a lead-in wire. The heating resistors 35A and 35B produced in this manner are passed therethrough by the sensor pipe 32 and fixed to it at adequate positions by adhesives.

The heat conducting member 41, which consists of a disk having a skirt 42 around the peripheral edge thereof and a projection 43 disposed at the center thereof and having an axial hole, is provided with side cuts 44A and 44B in the skirt at diagonally opposed positions and an opening 45 formed at an adequate position in the disk for passing the lead-in wires of the heating resistors 35A and 35B.

Figure 8:
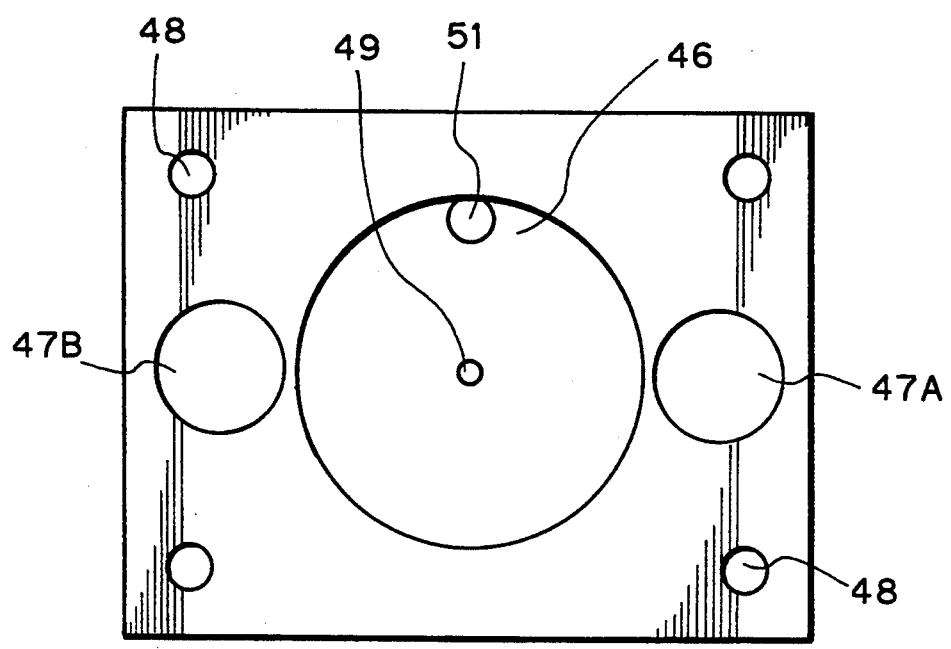
FIG. 8 is a bottom view of essential portions of the mass flow sensor shown in FIG. 6.

FIG. 8 is the bottom view of the upper casing 4 which is provided at the center of the bottom surface thereof with a large hole 46 cooperating with the cylindrical blind hole 23 of the lower casing 2 to define a chamber for receiving the sensor pipe 32, at positions opposite to the through-holes 21A and 21B of the lower casing 2 with holes 47A and 47B for tightly receiving the heads of the cylindrical connecting members 31A and 31B, and at positions near the four corners thereof with holes 48 corresponding to the threaded holes 13 of the base. The upper casing 4 is further provided on the bottom at the center of the large hole 46 with a threaded hole 49 to which the heat conducting member 41 is threadably engaged and at a suitable position near the periphery of the large hole 46 with an opening 51 for passing the lead-in wires of the heating resistors 35A and 35B therethrough. On the other hand, the upper casing 4 is provided on the top surface thereof with a cross-shaped thickened portion as shown in FIG. 5 and at the center thereof with a blind hole 53 for receiving an equal temperature coefficient matching resistance 52 which is sealed therein by means of a cover 55 having a through-hole 54 for passing lead-in wires therethrough.

The housing having the components described above is assembled in the following manner. First, the heating resistors 35A and 35B are mounted and fixed to the sensor pipe 32, and the cylindrical connecting members 31A and 31B are fitted at the opposite ends of the sensor pipe 32, respectively, and secured thereto by welding as shown in FIG. 5. The equal temperature coefficient matching resistance 52 is inserted into the blind hole 53 of the upper casing 4, the lead-in wires of the resistance 52 are drawn out through the through-hole 54 of the cover 55, and the cover 55 is secured to the upper casing 4 as by adhesives. The heat conducting member 41 is threadably engaged to the bottom of the upper casing 4 by means of a screw 61 with the side cuts 44A and 44B thereof at right angles to the side faces of the upper casing 4. The cylindrical connecting members 31A and 31B are fitted into the holes 47 on the bottom of the upper casing 4 while reducing the thicknesses at the heads thereof by means of the slots 33A and 33B, respectively. At this time, the sensor pipe 32 is, at the end upstream of the heating resistor 35A and at the end downstream of the heating resistor 35B thereof, in contact with the heat conducting member 41 through the side cuts 44A and 44B, thereof. The ends of the sensor pipe 32 in contact with the heat conducting member 41 are fixed thereto as by an inorganic adhesive. The upper casing 4 into which the cylindrical connecting members 31A and 31B holding the sensor pipe 32 therebetween are fitted is secured to the lower casing 2 by registering and fitting the bases of the cylindrical connecting members 31A and 31B into the through-holes 21A and 21B of the lower casing 2, respectively. By registering the holes 48 of the upper casing 4, the through-holes 22 of the lower casing 2, and the threaded holes 13 of the base 1, respectively, interposing an O-ring 63 between each of the through-holes 21A and 21B of the lower casing and the holes 12A and 12B of the base 1, and threadably engaging them together by a bolt 62, the housing is completely assembled. The lead-in wires of the heating resistors 35A and 35B are led out through the opening 45 of the heat conducting member 41 and the opening 51 of the upper casing 4.

Figure 9:
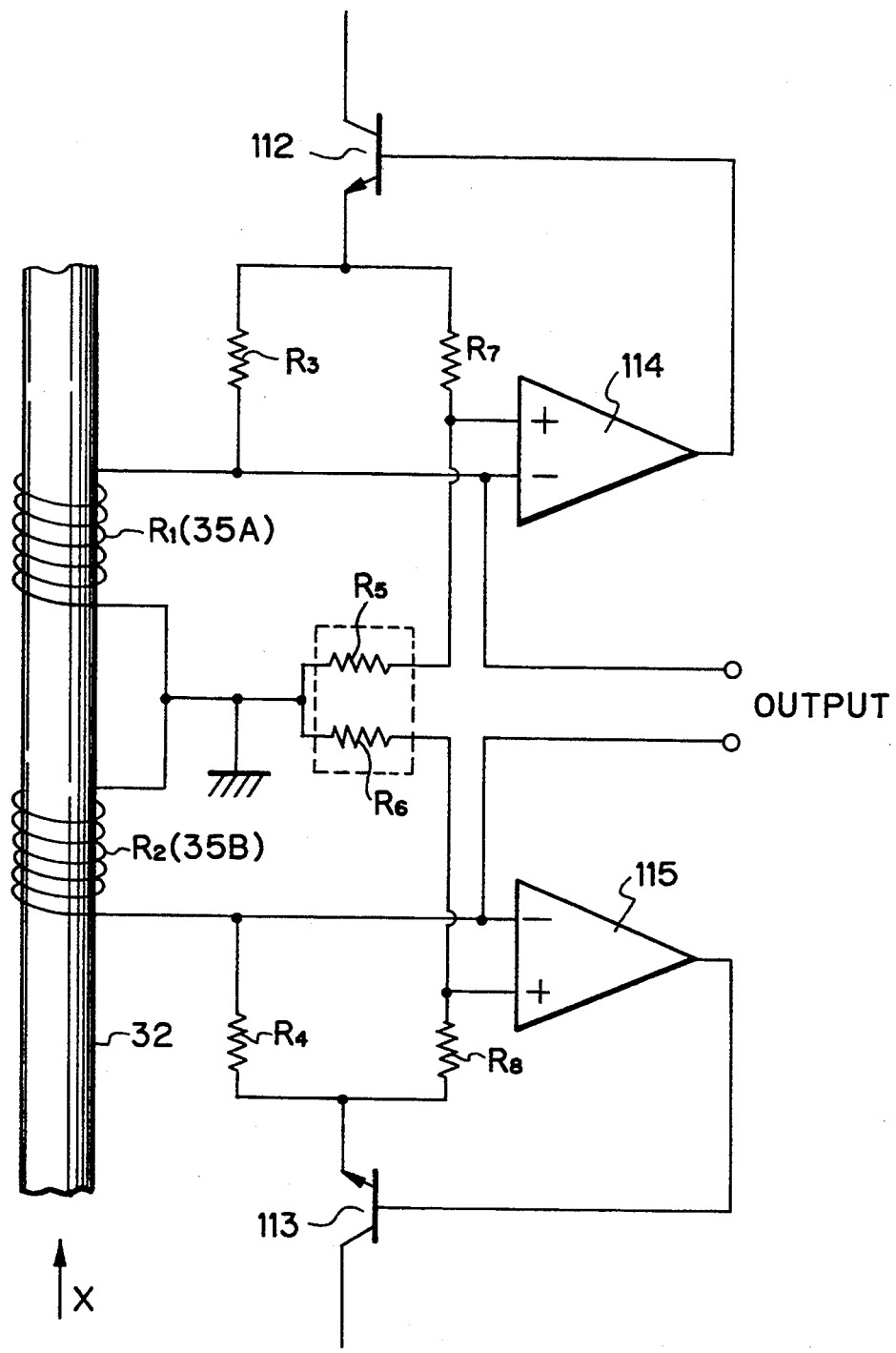
FIG. 9 is a circuit diagram of an embodiment of the mass flow sensor according to the present invention.

FIG. 9 shows the circuit construction of an embodiment of the mass flow sensor according to the present invention. In this embodiment, heating resistors $R_1$ and $R_2$ are provided about the sensor pipe 32 through which a fluid flows in the direction shown by an arrow X. An electric current at a certain voltage is supplied from a source (not shown) to a bridge circuit including the heating resistor $R_1$ through a transistor 112 and to a bridge circuit including the heating transistor $R_2$ through a transistor 113. The current branches from the transistor 112 to resistances $R_3$ and $R_7$. In this embodiment, a temperature sensitive matching resistance $R_5$ having the equal temperature coefficient is connected in series to the resistance $R_7$ between it and the earth. Likewise, the current branches from the transistor 113 into resistances $R_4$ and $R_8$. An equal temperature coefficient matching resistance $R_6$ having the same characteristics as the equal temperature coefficient matching resistance $R_5$ is connected in series to the resistance $R_8$ between it and the earth. A voltage derived from the connection point between the resistance $R_3$ and the heating resistor $R_1$ and a voltage derived from the connection point between the resistance $R_7$ and the equal temperature coefficient matching resistance $R_5$ are applied to a comparator 114 which obtains the difference therebetween and controls the base current of the transistor 112 to balance the bridge circuits. Likewise, a voltage derived from the connection point between the resistance $R_4$ and the heating resistor $R_2$ and a voltage derived from the connection point between the resistance $R_8$ and the equal temperature coefficient matching resistance $R_6$ are applied to a comparator 115 which obtains the difference therebetween and controls the base current of the transistor 113 to balance the bridge circuit.

Figure 10:
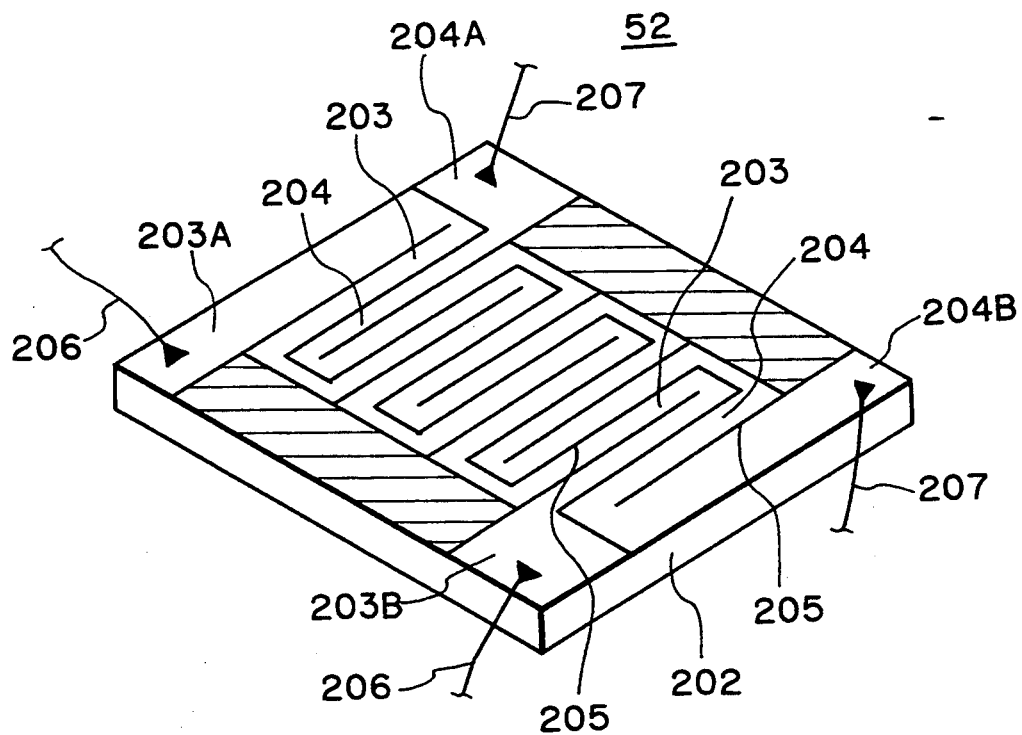
FIG. 10 is a perspective view of an embodiment of the temperature sensitive resistor used in the mass flow sensor according to the present invention.

Here, the temperature sensitive matching resistances $R_5$ and $R_6$ having the equal temperature coefficient may have the construction as, for example, shown in FIG. 10, in which a plate-like substrate 202 of, for example, ceramic is coated with platinum (Pt) by evaporation, and then the platinum coating is removed by laser working and trimming to expose the ceramic ground 205 so that the resultant resistances have equal resistance values and temperature coefficients. Lead-in wires 206 and 207 are connected to ends 203A, 203B and 204A, 204B of zigzag patterns 203 and 204, respectively. The ends 204A, 204B correspond to the matching resistance $R_5$ and the ends 203A, 203B correspond to the matching resistance $R_6$. The shaded portions are masked beforehand to prevent them from being caused to evaporate by platinum. The equal temperature coefficient temperature sensitive matching resistance having the construction described above is shown as 52 in FIG. 5.

In the embodiment having the construction described above, the temperature of the heating resistors $R_1$ and $R_2$ is predetermined to be several tens degrees higher than that of the matching resistances $R_5$ and $R_6$ and so controlled. The components $R_1$ to $R_8$ of the bridge circuits are constructed to have, when an electric current is applied to them, the values as follows: $R_1=R_2$, $R_3=R_4$ $R_5=R_6$, and $R_7=R_8$. In an example, $R_5=R_6=5$ K$\Omega$, $R_1=R_2=200$ $\Omega$ (25° C.), and the temperature coefficient of each of $R_1$, $R_2$, $R_3$ and $R_6$ is 3600 ppm.

In the embodiment of the mass flow sensor described above, now it is assumed that, when the temperature of the matching resistances $R_5$ and $R_6$ is 25° C. and that of the heating resistors $R_1$ and $R_2$ is 60° C., $R_1 \cdot R_7 = R_3 \cdot R_5$, that is the bridge circuit is in balance. Then, if the temperature of the matching resistances $R_5$ and $R_6$ rises to 45° C. due to a change in the ambient temperature, whereby the balance in the bridge circuit is lost, the outputs of the comparators 114 and 115 change to supply a larger current to the bridge circuit. As a result, when the temperature of the heating resistors $R_1$ and $R_2$ rises to 80° C., that is the difference in temperature between the heating resistors $R_1$ and $R_2$ and the matching resistances $R_5$ and $R_6$ returns to 35° C., the bridge circuits restore the balance.

A similar operation is performed in the bridge circuit including the heating resistor $R_2$.

In the embodiment described above, since the amount of energy required to change the temperature of a substance from $T_1$ to $T_1+\Delta T$ is equal to the amount of energy required to change the temperature of the substance from $T_2$ to $T_2+\Delta T$, the sensitivity of temperature detection using the matching resistances is not affected by the change in the ambient temperature. Further in this embodiment, the temperature of the heating resistors is controlled to be always higher than the ambient temperature or the gas temperature by a predetermined value, the mass flow can be accurately detected irrespective of the ambient temperature merely by providing an output terminal to an end of each of the heating resistors $R_1$ and $R_2$, thus obviating the need for a correction circuit.

In this embodiment, a precise operation is always secured even when there is an imbalance in heat radiation because the matching resistance 52 disposed substantially centrally of the housing is sensitive in operation to the average temperature of the housing.

While the embodiment of the present invention in which the constant temperature type mass flow sensor is improved and provided with matching resistances has been described, the principle of the present invention is applicable to the constant temperature type mass flow sensor provided with an element for temperature correction, in which case such an element may be disposed in the same chamber in which the sensor pipe is disposed.

Figure 11:
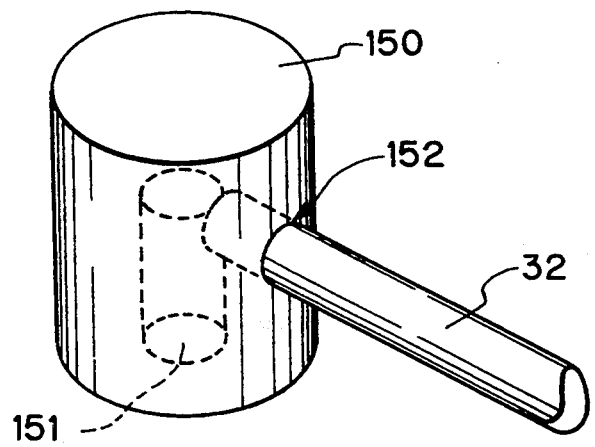
FIG. 11 is a perspective view of another embodiment of the cylindrical connecting member used in the mass flow sensor according to the present invention.

The construction of the cylindrical connecting member is not limited to that of the embodiment described above and shown in FIG. 5. In fact, it may take the form shown in FIG. 11, in which a cylindrical member 150 is provided with a hole 151 extending upward from the bottom and bent sideways immediately below the top surface. In the cylindrical connecting member 150 shown in FIG. 11, an end of the sensor pipe 32 is secured to a side opening 152 of the hole 151 as by vacuum nickel brazing. This is particularly suitable because it eliminates the need for bending the sensor pipe 32 itself.

Now, a temperature sensitive matching resistor composing each of the temperature sensitive matching resistances $R_5$ and $R_6$ will be described below in greater detail. The temperature sensitive matching resistor comprises substantially the plate-like ceramic substrate 202 of, for example, the size 10 mm$\times$10 mm$\times$0.5 mm which is masked in the shaded areas as shown in FIG. 10 and evaporated by platinum (Pt) in the thickness of 1 $\mu$m. The evaporated platinum coating is partially removed in lines to form an uncoated portion 205 of the ceramic substrate as by laser working and trimming so as to divide the unmasked surface area of the substrate into the two areas 203 and 204 which are symmetrical to each other with respect to a point as shown in FIG. 10. Then, the lead-in wires 206 and 207 are connected to the ends 203A, 203B and 204A, 204B of the patterns of the areas 203 and 204, respectively, as by conductive paste.

Figure 12:
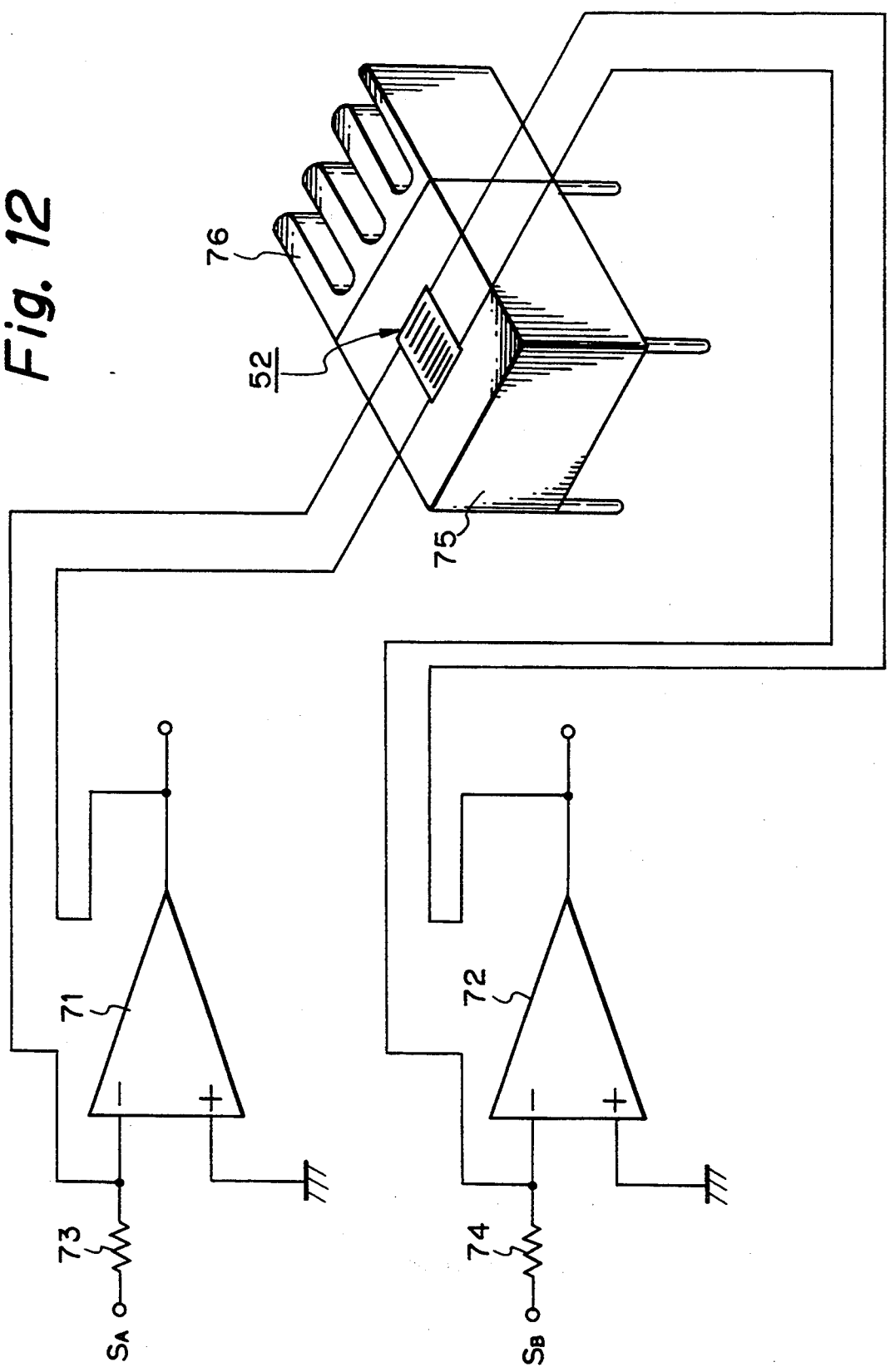
FIG. 12 shows the temperature sensitive resistor according to the present invention in actual use.

In the temperature sensitive matching resistor produced in the processes described above, the resistance formed by the pattern of the area 203 and the resistance formed by the pattern of the area 204 have the same resistance value (5 K$\Omega$ in the example described above) and the same temperature coefficient (3600 PPM in the example described above). FIG. 12 shows an example of actual use of this temperature sensitive matching resistor, in which signals $S_A$ and $S_B$ are amplified by inversion amplifiers 71 and 72, respectively, and outputted. Resistances existing in the patterns of the areas 203 and 204 of the temperature sensitive matching resistor 52 mounted on a base 75 are used as feedback resistances connected to input resistances 73 and 74, respectively. The base 75 is provided with radiation fins 76. In this arrangement, the temperature is very accurately corrected by the resistances having the temperature coefficient described above.

In the matching resistances constructed as described above, even when temperature distribution is generated in the ceramic substrate 202, the two patterns of the two resistances constituting the matching resistances always occupy substantially equal areas, respectively, and accordingly, the two resistances keep the equal resistance values.

Figure 13:
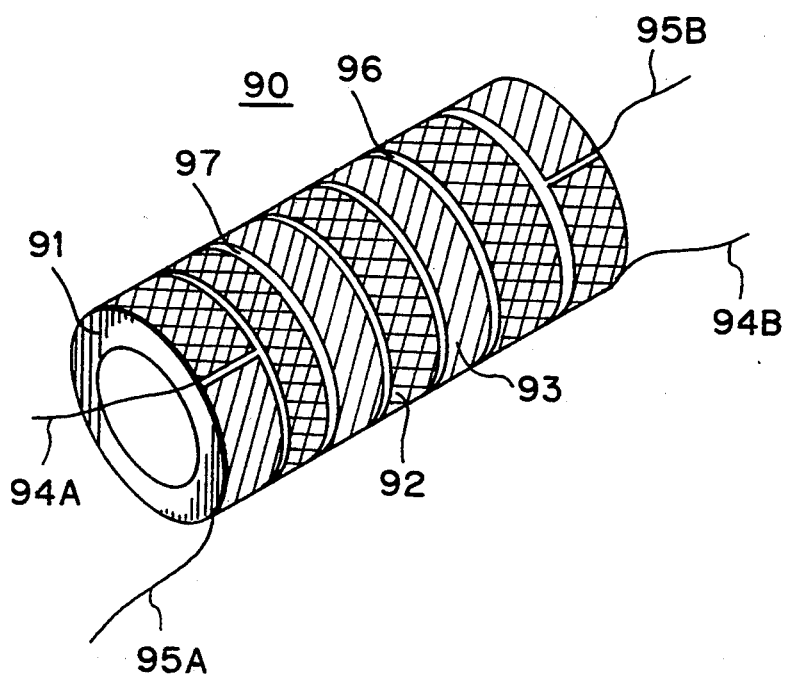
FIG. 13 is a perspective view of another embodiment of the temperature sensitive resistor used in the mass flow sensor according to the present invention.

FIG. 13 shows another embodiment of the temperature sensitive matching resistor 90 according to the present invention. This temperature sensitive matching resistor 90 has a ceramic pipe 91 as its substrate. This ceramic pipe 91 may have the dimensions of, for example, 0.5 mm$\phi$ inside diameter, 0.7 mm$\phi$ outside diameter and 10 mm length. Of course, these dimensions may be changed as required. This ceramic pipe 91 is coated on the outer peripheral surface with platinum (Pt) in the thickness of 1 $\mu$ by evaporation. Then, the platinum coating is partially removed by laser working and trimming to expose uncoated ceramic ground portions 96 and 97 having a width of 0.2 mm, to thereby obtain two strips of platinum patterns 92 and 93 formed in symmetrical bifilar winding. At both ends of the ceramic pipe 91, the platinum coating is removed longitudinally by laser working and trimming to prevent the patterns 92 and 93 from being interconnected. Lead-in wires 94A, 94B and 95A, 95B are connected to the ends of the patterns 92 and 93, respectively, by, for example, a conductive paste. As a result, the patterns 92 and 93 have the same shape and length and, accordingly, the resistances constituted by these patterns have the same characteristics. In this embodiment, likewise in the embodiment shown in FIG. 10, even when temperature distribution is generated in the ceramic substrate 91, the two resistances maintain equal levels.

In the embodiment shown in FIG. 13, the lead-in wires 94A and 95A are for the temperature sensitive matching resistance $R_5$ while the lead-in wires 94B and 95B are for the temperature sensitive matching resistance $R_6$. Since a small current flows in the temperature sensitive matching resistances $R_5$ and $R_6$, these resistances $R_5$ and $R_6$ have a large resistance value so that the measurement is not affected by the heat generated by the current flowing in them. While the heating resistors $R_1$ and $R_2$ may be wound about the pipe 32 as shown in FIG. 9, they are preferably produced, as in the temperature sensitive matching resistances $R_5$ and $R_6$, by evaporating platinum onto a ceramic tube and partially removing the platinum coating by laser working and trimming so that they have the same temperature coefficient as the temperature sensitive matching resistances $R_5$ and $R_6$. These heating resistors $R_1$ and $R_2$ and temperature sensitive matching resistances $R_5$ and $R_6$ which are produced with the ceramic tube as the substrate are disposed, as shown in FIG. 14, at suitable positions on a pipe through which a fluid flows and secured thereto, for example, by an adhesive agent.

Figure 14:
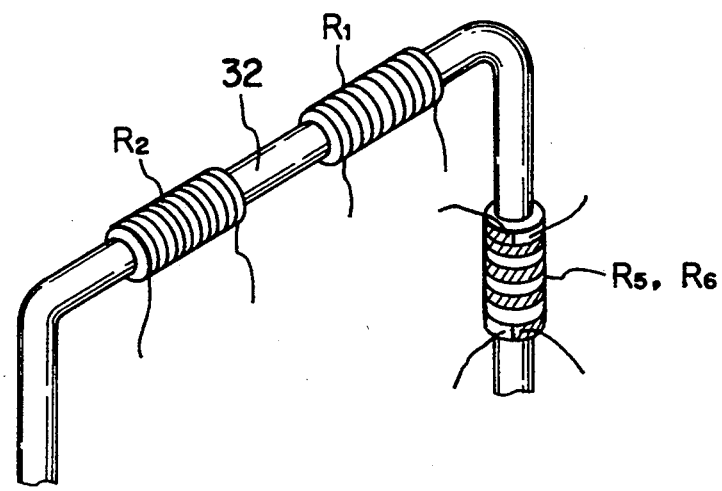
FIG. 14 is a perspective view of the heating resistors mounted on an embodiment of the pipe in the mass flow sensor according to the present invention.
Figure 15:
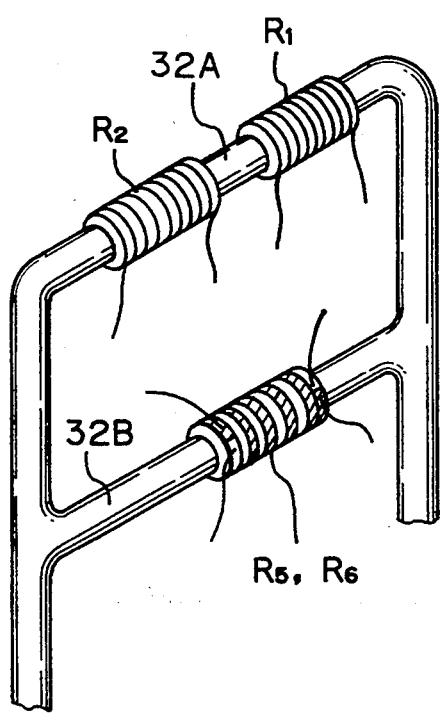
FIG. 15 is a perspective view of the heating resistors mounted on another embodiment of the pipe in the mass flow sensor according to the present invention.

In the embodiment shown in FIG. 9, the temperature sensitive matching resistances $R_5$ and $R_6$ are disposed, for example, at suitable positions inside the housing of the mass flow sensor and in the embodiment shown in FIG. 13, the matching resistances $R_5$ and $R_6$ are disposed on the, ceramic pipe 91 on which the heating resistors $R_1$ and $R_2$ also are disposed as shown in FIG. 14. However, the sensor pipe 32 may be divided, as shown in FIG. 15, into two branches 32A and 32B between the inlet and outlet thereof so that the heating resistors $R_1$ and $R_2$ are disposed on the first branch 32A and the temperature sensitive matching resistances $R_5$ and $R_6$ are disposed on the second branch 32B. These two branches 32A and 32B have the same inside and outside diameters as each other. By this construction, it is made possible to accurately measure the temperature of the gas flowing in the second branch 32B which is not affected by the heat generated by the heating resistors $R_1$ and $R_2$.

In ordinary cases where the ambient temperature is substantially equal to the gas temperature to be measured, the construction shown in FIG. 9 is sufficiently applicable. However, in cases where a large amount of fluid is allowed to flow through the sensor pipe, the construction shown in FIG. 13 or 14 is used to more accurately detect the gas temperature because the ambient temperature and the gas temperature are often different from each other.

Figure 16:
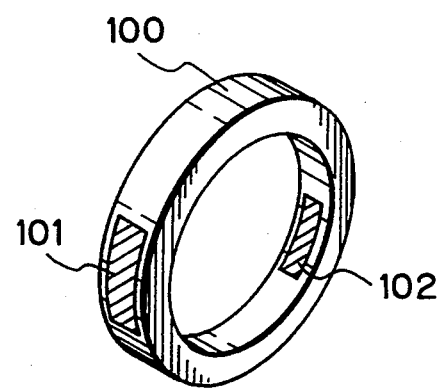
FIG. 16 is a perspective view of an embodiment of a ring to be attached to an end of the temperature sensitive matching resistor according to the present invention.
Figure 17:
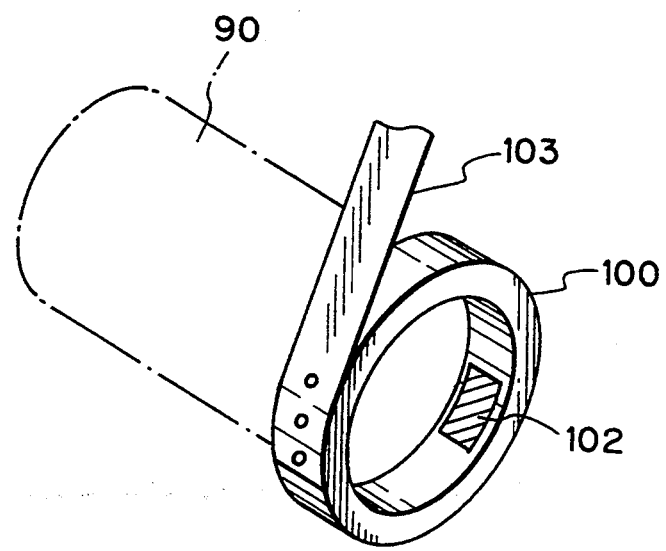
FIG. 17 is a perspective view of another embodiment of the ring to be attached to an end of the temperature sensitive matching resistor according to the present invention.

FIG. 16 shows a ring 100 for pulling the lead-in wires out of the temperature sensitive matching resistor 90 shown in FIG. 13. This ring 100 having the inside diameter substantially equal to the outside diameter of the resistor 90 can be fitted over the end of the resistor 90. The ring 100 is formed of an insulating material as the substrate which is provided with conductive pieces 101 and 102 (for example, nickel) embedded at positions corresponding to the ends of the patterns 92 and 93, respectively. The ring 100 is, as shown in FIG. 17, fitted over each of the ends of the temperature sensitive matching resistor 90 on the conductive piece 101 of which a strip of platinum foil 103 having the same width as the ring (for example, 0.5 mm) and the thickness of 0.1 mm is placed and connected thereto by resistance welding. Another strip of the platinum foil is connected likewise to the conductive piece 102. In this manner, the matching resistor 90 is provided at each of the ends thereof with two lead-in wires of platinum foil.

The ring shown in FIG. 16 and 17 is applicable to the temperature sensitive resistance 52 shown in FIG. 10, in which the ring is formed in a square frame provided with conductive pieces embedded at suitable positions and fitted over the ends of the resistance.

By using the ring described above, a problem of slight fluctuation of the resistance value dependent upon the amount of conductive paste can be eliminated and temperature sensitive resistances of high accuracy can be provided.

Further, the temperature sensitive matching resistor according to the present invention may be modified to include three or more conductive patterns and three or more resistances.

While we have shown and described certain specific embodiments of our invention, it will be understood that these embodiments are merely for the purpose of illustration and description and that various other forms may be devised within the scope of our invention, as defined in the appended claims.

What is claimed is:

1. A mass flow sensor comprising a first heating resistor and a second heating resistor disposed on the upstream side and the downstream side, respectively, of a fluid pipe with respect to the flow of a fluid within the fluid pipe, for detecting a mass flow thereof, characterized in that said mass flow sensor further comprises:
   a first bridge circuit having first and second bridge routes each defining separate current paths and including said first heating resistor in said first bridge route;
   a second bridge circuit having third and fourth bridge routes each defining separate current paths and including said second heating resistor in said third bridge route;
   a control circuit for supplying an electric current to each of said first and second bridge circuits so as to bring each of said first and second bridge circuits into a balanced state; and first and second temperature sensitive resistances which are responsive to ambient temperature changes and have equal temperature coefficients and which are respectively disposed in said second bridge route of said first bridge circuit and said fourth bridge route of said second bridge circuit;

wherein said first and second heating resistors are disposed on a ceramic tube fitted over the fluid pipe and said first and second temperature sensitive resistances are formed of a tubular substrate having an inside diameter which is fitted over the fluid pipe, said first and second heating resistors and said tubular substrate being spaced apart along a length of said fluid pipe, and wherein said fluid pipe has a first branch pipe and a second branch pipe branched therefrom between an inlet and outlet of said fluid pipe, and said first and second heating resistors and said first and second temperature sensitive resistances are disposed around said first branch pipe and said second branch pipe, respectively.

2. A mass flow sensor as set forth in claim 1, characterized in that said first and second temperature sensitive resistances are formed by coating a platinum layer on the surface of a tubular ceramic substrate.

3. A mass flow sensor comprising at least one heating resistor disposed in a portion of a sensor pipe through which a fluid flows, for detecting the mass flow thereof, characterized in that said mass flow sensor further comprises:

a bridge circuit including said heating resistor and a temperature sensitive resistance which is responsive to ambient temperature changes for detection of ambient temperature; and a housing for receiving said sensor pipe therein, said housing being provided with said temperature sensitive resistance;

wherein said housing is provided with a chamber for receiving said sensor pipe and a heat conductor which is attached to said chamber and is in contact with said sensor pipe on an upstream side and a downstream side of said heating resistor relative to a direction of fluid flow.

4. A mass flow sensor as set forth in claim 3, characterized in that:

said housing comprises a lower casing constituting the lower portion of said chamber for receiving said sensor pipe and an upper casing constituting the upper portion of said chamber;

said sensor pipe is provided at each of both the ends thereof with a cylindrical connecting member having a hole for leading in and out a fluid therethrough; and each of said upper and lower casings is provided with a positioning recess for positioning said cylindrical connecting member.

5. A mass flow sensor comprising a first heating resistor and a second heating resistor disposed on the upstream side and the downstream side, respectively, of a fluid pipe with respect to the flow of a fluid within the fluid pipe, for detecting a mass flow thereof, characterized in that said mass flow sensor further comprises:

a first bridge circuit having first and second bridge routes each defining separate current paths and including said first heating resistor in said first bridge route;

a second bridge circuit having third and fourth bridge routes each defining separate current paths and including said second heating resistor in said third bridge route;

a control circuit for supplying an electric current to each of said first and second bridge circuits so as to bring each of said first and second bridge circuits into a balanced state; and first and second temperature sensitive resistances which are responsive to ambient temperature changes and have equal temperature coefficients and which are respectively disposed in said second bridge route of said first bridge circuit and said fourth bridge route of said second bridge circuit;

wherein said first and second temperature sensitive resistances are formed on a same substrate, and wherein said fluid pipe has a first branch pipe and a second branch pipe branched therefrom between an inlet and outlet of said fluid pipe, and said first and second heating resistors and said first and second temperature sensitive resistances are disposed around said first branch pipe and said second branch pipe, respectively.

6. A mass flow sensor comprising at least one heating resistor disposed in a portion of a sensor pipe through which a fluid flows, for detecting the mass flow thereof, characterized in that said mass flow sensor further comprises:

a bridge circuit including said heating resistor and a temperature sensitive resistance which is responsive to ambient temperature changes for detection of ambient temperature; and a housing for receiving said sensor pipe therein, said housing being provided with said temperature sensitive resistance;

wherein said housing is provided with a chamber for receiving said sensor pipe and a chamber for receiving said temperature sensitive resistance, and wherein said housing is provided with a chamber for receiving said sensor pipe and a heat conductor which is attached to said chamber and is in contact with said sensor pipe of an upstream side and a downstream side of said heating resistor relative to a direction of fluid flow.

7. A mass flow sensor as set forth in claim 6, characterized in that:

said housing comprises a lower casing constituting the lower portion of said chamber for receiving said sensor pipe and an upper casing constituting the upper portion of said chamber;

said sensor pipe is provided at each of both the ends thereof with a cylindrical connecting member having a hole for leading in and out a fluid therethrough; and each of said upper and lower casings is provided with a positioning recess for positioning said cylindrical connecting member.

8. A mass flow sensor comprising at least one heating resistor disposed in a portion of a sensor pipe through which a fluid flows, for detecting the mass flow thereof, characterized in that said mass flow sensor further comprises:

a bridge circuit including said heating resistor and a temperature sensitive resistance which is responsive to ambient temperature changes for detection of ambient temperature; and a housing for receiving said sensor pipe therein, said housing being provided with said temperature sensitive resistance;

wherein said housing is provided with a chamber for receiving said sensor pipe and a chamber for receiving said temperature sensitive resistance, wherein said housing comprises a lower casing constituting the lower portion of said chamber for receiving said sensor pipe and an upper casing constituting the upper portion of said chamber, wherein said sensor pipe is provided at each of both the ends thereof with a cylindrical connecting member having a hole for leading in and out a fluid therethrough, and wherein each of said upper and lower casings is provided with a positioning recess for positioning said cylindrical connecting member.

* * * * *